United States Patent
Ma et al.

(10) Patent No.: US 6,925,520 B2
(45) Date of Patent: Aug. 2, 2005

(54) SELF-OPTIMIZING CROSSBAR SWITCH

(75) Inventors: James H. Ma, San Jose, CA (US); Lisa C. Grenier, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 607 days.

(21) Appl. No.: 09/871,277

(22) Filed: May 31, 2001

(65) Prior Publication Data

US 2004/0225787 A1 Nov. 11, 2004

(51) Int. Cl.[7] ............................................. G06F 13/00
(52) U.S. Cl. ....................... 710/317; 710/311; 710/241; 710/244
(58) Field of Search ...................... 315/189.01; 370/357, 370/360, 363; 710/5, 305, 311, 316, 317, 241, 244

(56) References Cited

U.S. PATENT DOCUMENTS

| | | | | |
|---|---|---|---|---|
| 4,130,864 A | * | 12/1978 | Schlotterer ................... | 710/241 |
| 4,258,417 A | * | 3/1981 | Berglund et al. .............. | 710/5 |
| 5,210,829 A | * | 5/1993 | Bitner .......................... | 710/57 |
| 5,309,426 A | * | 5/1994 | Crouse et al. .............. | 370/427 |
| 5,436,886 A | | 7/1995 | McGill | |
| 5,559,970 A | | 9/1996 | Sharma | |
| 5,613,146 A | | 3/1997 | Gove et al. | |
| 5,896,516 A | * | 4/1999 | Powell et al. ................ | 710/317 |
| 6,038,630 A | * | 3/2000 | Foster et al. ................ | 710/317 |
| 6,072,772 A | | 6/2000 | Charny et al. | |
| 6,289,409 B1 | * | 9/2001 | Bacigalupo .................. | 710/305 |
| 6,359,861 B1 | | 3/2002 | Sui et al. | |
| 6,480,927 B1 | * | 11/2002 | Bauman ...................... | 710/317 |
| 6,625,160 B1 | | 9/2003 | Suzuki | |
| 2001/0050916 A1 | | 12/2001 | Krishna | |

OTHER PUBLICATIONS

TechEncyclopedia, definition for "glue logic" and "operation code", http://www.techweb.com.*

* cited by examiner

*Primary Examiner*—Mark H. Rinehart
*Assistant Examiner*—Justin King
(74) *Attorney, Agent, or Firm*—Meyertons Hood Kivlin Kowert & Goetzel, P.C.; B. Noël Kivlin

(57) ABSTRACT

A crossbar switch is disclosed. The crossbar switch comprises a plurality of input sorting units and a plurality of merge and interleave units. Each input sorting unit is capable of receiving from a respective device an access request to any one of a plurality of physical memory devices. Each merge and interleave unit is capable of arbitrating among competing access requests received from any of the input sorting units, selecting one of the competing access requests and forwarding the selected request for implementation on a respective memory device. Also disclosed is method implemented by the crossbar switch.

33 Claims, 13 Drawing Sheets

SELF-OPTIMIZING CROSSBAR SWITCH

BACKGROUND OF THE INVENTION

1. Field of the Invention

The present invention pertains to a crossbar switch, and, more particularly, a self-optimizing crossbar switch capable of selecting and distributing multiple concurrent memory requests to a shared memory system such that the memory access are optimized and the selection of requests are optimized.

2. Description of the Related Art

The evolution of electronic computing systems has included the development of more sophisticated techniques for utilizing their computing resources. Consider, for example, a shared memory. A shared memory may be read from and written to by more than one device, e.g., several processors. The devices perform their assigned functions, reading from and writing to the shared memory. The devices request access to the shared memory through a memory controller that controls the operation of the shared memory. Typically, several devices are trying to access the shared memory in this fashion at any given time. However, for a variety of reasons, the devices generally are permitted to access the shared memory only one at a time. The memory controller, or some electronic circuitry associated with the memory controller, must select one of the access requests to process at any given time.

Consider, for instance, a graphics processing system. One memory intensive operation associated with graphics processing is "rendering." "Rendering" is the process by which a graphics system adds realism to video data by adding three-dimensional qualities such as shadows and variations in color and shade. Because of the high rate at which the graphics data is processed, a rendering machine will typically include multiple "rendering pipelines" operating in parallel. A rendering machine may also employ multiple physical memory devices, each with its own controller, to implement a "frame buffer pixel memory," or "frame buffer," in conjunction with the rendering pipelines.

Management of this memory is important to the overall performance of the graphics processing system. One way to manage the memory is to restrict each rendering pipeline to a certain subset of the graphics data to process and a certain portion of the frame buffer. The assigned portion of the frame buffer is accessible through an assigned memory controller. However, higher performance can be obtained if the rendering pipelines are not restricted in this manner, i.e., if they can work on any part of the graphics data stored in any part of the frame buffer. Lifting this restriction, however, includes instituting measures for proper management of the access to the memory. As each rendering pipeline begins issuing requests to access the various portions of the memory, it will at some point try to access a portion that another rendering pipeline wishes to access at the same time. Since access can be granted to only one rendering pipeline at a time, they compete for the access and one or the other is selected.

Several techniques are conventionally employed for deciding the order in which simultaneously pending access requests are processed. One conventional technique is a "round robin" method, wherein access requests are handled in some round robin order, depending on the hardware involved. Another conventional technique processes access requests in order of an assigned priority. Still other conventional techniques process access requests in random order, or on a first-come, first-served basis.

Each of these conventional techniques is built around and implements a rigid set of ordering rules that are predefined and then rigorously implemented. The wooden, mechanical application of the ordering rules inherent in these conventional techniques frequently adversely impacts performance. More particularly, the order in which access requests are processed can significantly impact the bandwidth of the information processed responsive to the access requests.

For instance, the internal design of the dynamic random access memory ("DRAM") devices from which shared memories are typically constructed favor accesses to data in the same "page." A page is a block of data that the internal DRAM control logic operates on for each access. Internal DRAM data is organized as pages, so that successive accesses to data bits that are in the same page are faster than successive accesses to data bits that are not in the same page. Because of this characteristic of DRAMs, it is more efficient to select memory requests that access data bits in the same DRAM page. Higher memory bandwidth can be achieved if successive memory requests are all accessing the same page of data. Thus, increased performance can be realized by ordering accesses to maximize the number of successive accesses to the same page(s).

Similarly, the total request throughput rate may be impacted by the selection order. It is common for requesting ports to have first-in, first-out ("FIFO") queues that buffer memory requests and FIFOs that buffer the memory data returned by read memory requests. As long as these FIFOs are not filled, additional request may be generated and new memory read data returned. If a request FIFO is filled, then the corresponding port must stop and wait until the FIFO has room again. Thus, the request throughput rate will be lower. Likewise, if the memory read data FIFO is filled, then the memory controller must stop and wait until there is room in the FIFO. Again, the request throughput rate suffers. Because of the finite capacity of FIFOs used to store requests and memory read data, it is more efficient to select requests such that the FIFOs will not be filled. By avoiding the full condition, requests may be continually processed with no interruption. Thus, a higher request throughput rate is achieved.

To maximize efficiency and throughput rate under these types of constraints, arbitration and select logic used to decide the selection order should dynamically consider these types of factors. During each operational cycle, the requests should be examined for impact on performance and the more favorable request selected. It is also desirable to adjust the importance of priority of each of these constraints. This allows the various constraints to be weighed differently in making the selection.

However, conventional arbitration and select techniques consider none of these factors in a dynamic fashion. If they are considered at all, they are considered only in a mechanical fashion. Predetermined rules are woodenly applied. If a technique considers, for instance, two successive requesting access to the same page, whether a third request resides in a full FIFO is considered in the same fashion every time. Thus, although the shared memory might appreciate higher utilization, its performance is typically less than what it could be.

SUMMARY OF THE INVENTION

The invention includes a method and apparatus implementing a self-optimizing crossbar bar switch. Note that, in the context of the invention, the term "optimized" does not imply the highest possible degree. Instead, the term "optimized" is used as it is in the art, i.e., to imply an improved degree of performance.

In a first aspect, the invention includes a crossbar switch, comprising a plurality of input sorting units and a plurality of merge and interleave units. Each input sorting unit is capable of receiving from a respective device an access request to any one of a plurality of physical memory devices. Each merge and interleave unit is capable of arbitrating among competing access requests received from any of the input sorting units, selecting one of the competing access requests and forwarding the selected request for implementation on a respective memory device.

In a second aspect, the invention includes a method for accessing a shared memory. The method begins by receiving a plurality of access requests from a plurality of devices, each access request being received by a respective input sorting unit associated with the respective one of the devices issuing the respective access request. Next, the method forwards a plurality of received access requests to a plurality of merge and interleave units, each merge and interleave unit being associated with a respective one of a plurality of memory devices. This is followed by receiving at one of the merge and interleave units a plurality of forwarded access requests. Next, a respective one is dynamically selected from among forwarded access requests. Then, the selected access request is forwarded to a respective one among a plurality of memory devices associated with the merge and interleave unit.

BRIEF DESCRIPTION OF THE DRAWINGS

The invention may be understood by reference to the following description taken in conjunction with the accompanying drawings, in which like reference numerals identify like elements, and in which.

Figure 1:
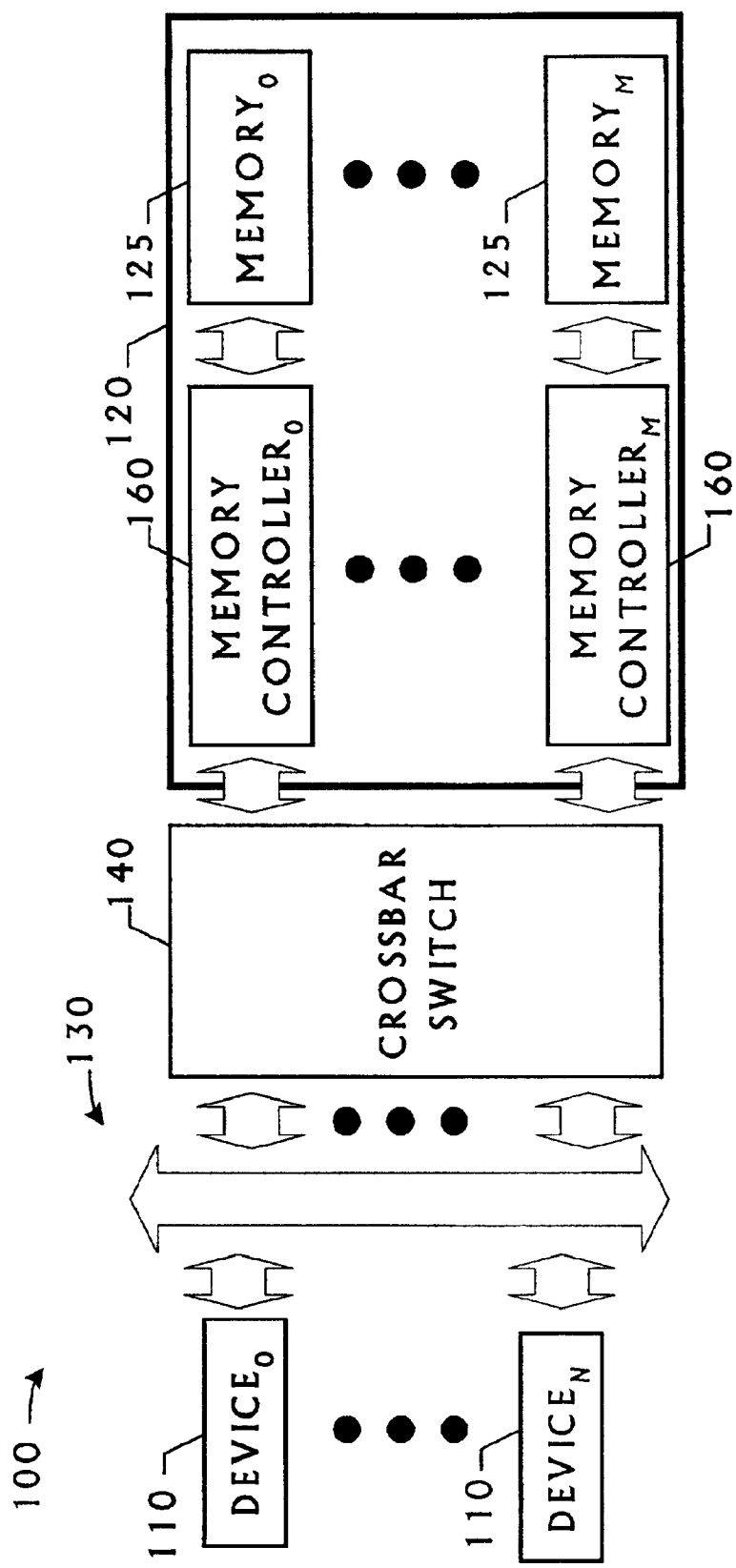
FIG. 1 depicts, in conceptual block diagram, a memory subsystem of a computing device, not otherwise shown, constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates in a block diagram a memory subsystem 100 of a computing device, not otherwise shown, constructed and operated in accordance with the present invention. The computing device in the illustrated embodiment is a Sun UltraSPARC workstation (e.g., from the Sun Blade™ or the Ultra™ line of workstations) employing a UNIX-based operating system (e.g., a Solaris™ OS) commercially available from the assignee of this application, Sun Microsystems, Inc. However, the invention is not so limited. The computing device may be implemented in virtually any type of electronic computing device such as a laptop computer, a desktop computer, a mini-computer, a mainframe computer, or a supercomputer. The workstation is built around an UltraSPARC™ 64-bit processor available from Sun Microsystems, but the invention, again, is not so limited. The microSPARC™ from Sun Microsystems, any of the Itanium™ or Pentium™-class processor from Intel Corporation, the Athlon™ or Duron™ class processors from Advanced Micro Devices, Inc., or the Alpha™ processor from Compaq Computer Corporation might also be employed in alternative embodiments.

The memory subsystem 100 includes a plurality of devices 110 generating access requests for a shared memory 120, which includes several physical memory devices 125. Each physical memory device 125 operates in accordance with commands from a respective memory controller 160. In one particular embodiment, discussed more fully below, the memory subsystem 100 is a portion of a graphics processing system. In this particular embodiment, the devices 110 are frame buffer controllers outputting access requests from a rendering pipeline and the shared memory 120 is a frame buffer. However, the invention is not so limited. The invention may be employed in any type of electronic computing system having a shared memory.

The access requests are communicated from the devices 110 over the bus system 130. The memory subsystem 100 includes a crossbar switch 140 constructed and operated in accordance with the present invention that receives the access requests off the bus system 130. The crossbar switch 140 directs the access requests to their appropriate destination. This includes arbitrating among competing access requests for the same physical memory device 125 and selecting one for implementation. The crossbar switch 140 outputs the selected access requests to the memory controllers 160, which implements the access requests to or from the memory 120, depending on whether the access is a write or a read. The devices 110, shared memory 120, and memory controllers 160 may be implemented using any conventional technique known to the art so long as the memory 120 is implemented as a shared memory.

Figure 2:
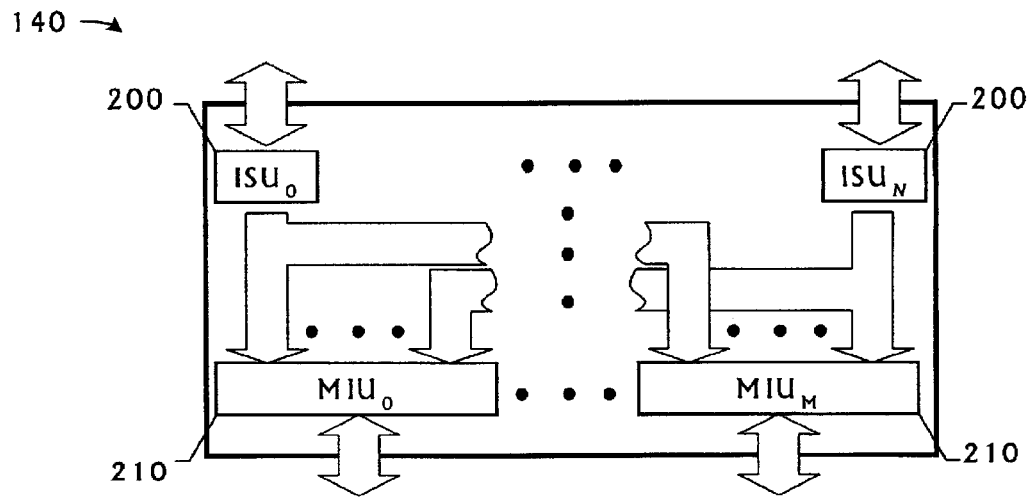
FIG. 2 depicts, again in a conceptual block diagram, the arbitration and selection logic of the memory subsystem of FIG. 1.

FIG. 2 conceptually illustrates in a block diagram the crossbar switch 140 of the memory subsystem 100 of FIG. 1. The crossbar switch 140 generally comprises a plurality of input sorting units ("ISU") 200, one for each of the devices 110. The ISUs 200 may be implemented using any suitable technique known to the art. One particular embodiment discussed further below implements the ISUs 200 in first-in, first-out ("FIFO") queues accompanied by circuitry for address determining and manipulation. The crossbar switch 140 also includes a merge and interleave unit ("MIU") 210 for each physical memory device 125, to which each ISU 200 is, in the illustrated embodiment, hardwired. Each ISU 200 receives access requests over the bus system 130 from its respective device 110 and determines for which physical memory device 125 access requests are directed. The ISUs 200 then forward the received access requests to the MIU 210 as as they are received. In each operational cycle, each MIU 210 looks at each of the access requests presented by the ISUs 200 and selects one for further processing.

The MIUs 210 dynamically consider a number of factors in each selection, such as:
 factors maximizing the bandwidth efficiency of the shared memory 120, i.e., the operational characteristics of the requests themselves;
 factors minimizing stalls on requests processed through the ISUs 200, i.e., the operational characteristics of the crossbar switch 140 itself; and
 fairness, meaning that, all other things being equal, no ISU 200 is favored over another.
As will be appreciated by those skilled in the art having the benefit of this disclosure, the exact identity of the factors considered and the weight given them will be implementation specific. The invention therefore admits wide variation in the manner in which these and other factors can be weighed and considered.

Figure 3:
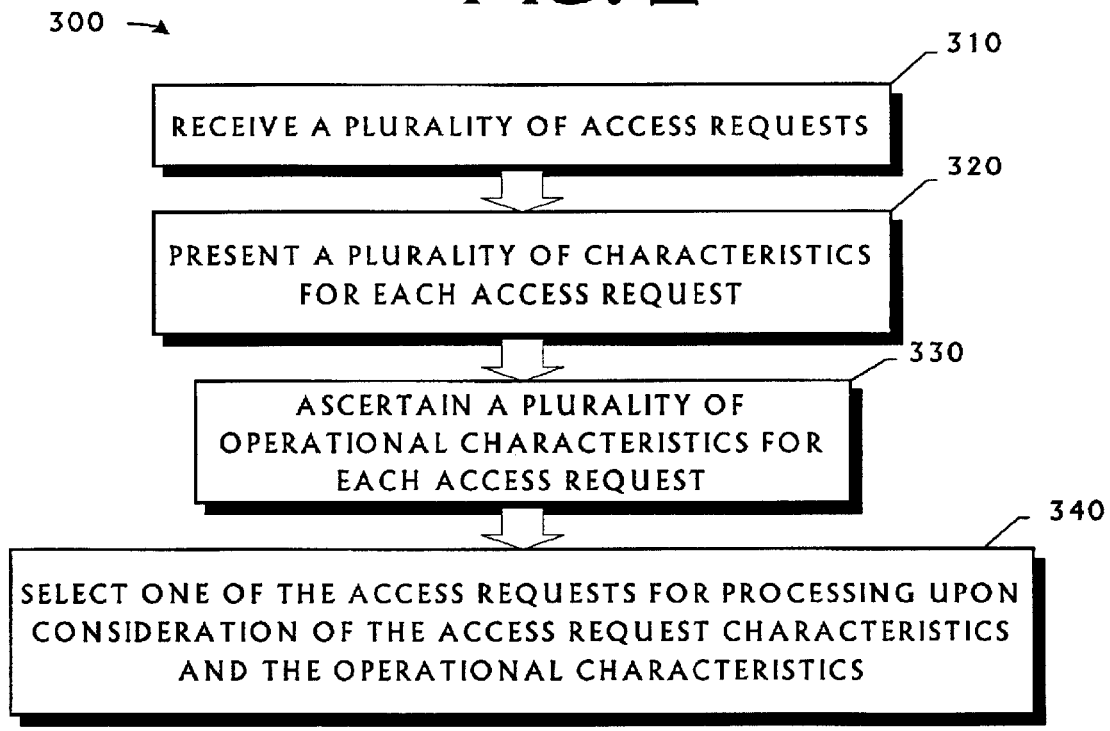
FIG. 3 illustrates one particular embodiment of a method for arbitrating and selecting one access request to a shared memory from among multiple contenders in accordance with the present invention.

FIG. 3 illustrates one particular method 300 implemented by the crossbar switch 140 as shown in FIG. 2 in accordance with the present invention. As set forth in box 310, the method 300 begins when the ISUs 200 receive access requests. As each ISU 200 receives an access request, it presents certain characteristics of the access request to the MIU 210, as set forth in box 320. The factors influencing the selection of these requests are discussed further below. Next, the MIU 210 ascertains selected operational characteristics associated with the request, e.g., whether the ISU 200 in which it resides is full, as is set forth in box 330. Finally, as set forth in box 340, the MIU 210 selects one of the access requests for processing upon consideration of the access request characteristics and the operational characteristics. Note that, because the operational characteristics are ascertained at the time the access request is presented, and because the access request characteristics are presented as the access requests are received, the MIU 210 is considering these factors dynamically.

Turning now to FIGS. 4–12, one particular embodiment 400 of the present invention is presented to further an understanding of the present invention. The embodiment 400 is a graphics processing system. The graphics processing system 400 interfaces with the host computing device (not otherwise shown) through a system interface 405 and includes four rendering pipelines 410. Note that the number of rendering pipelines 410 is not material to the practice of the invention. The graphics processing system 400 includes four devices 412 that are, in the illustrated embodiment, rendering units. Each rendering unit further includes pixel processor ("PP") 413 and a frame buffer controller ("FBC") 415, i.e., $FBC_0$–$FBC_3$, each with a rendering pipeline (not shown). The FBCs 415 generate memory access requests that are communicated over the bus system 420 and performed through the two crossbar switches 425 in the frame buffer 440. The frame buffer 440 includes eight physical memory devices 434. Each physical memory device 434 comprises multiple DRAM devices 445 arranged in banks in a conventional interleaved memory technique. The memory controllers (not shown in FIG. 4) comprise a portion of the crossbar switch 425 in this particular embodiment, as will be discussed further below.

Note that the graphics processing system 400 includes two crossbar switches 425, each servicing four physical memory devices 434 in the frame buffer 440. As indicated by the arrow 442, the crossbar switches 425 are hardwired, in the illustrated embodiment, to permit communication between the various components of the crossbar switches 425. Note that this interconnection can be implemented differently in alternative embodiments. For instance, such an interconnection may be implemented in software or through functional logic. Thus, the ISUs 200 (shown in FIG. 2) of the first crossbar switch 425 and the MIUs 210 (also shown in FIG. 2) of the second crossbar switch 425 can communicate as can the ISUs 200 of the second crossbar switch 425 and the MIUs 210 of the first crossbar switch 425. This is an implementation specific feature. In theory, a single crossbar switch 425 can service any number of rendering units 410 and any number of physical memory devices 434 simply by scaling the number of ISUs 200 and MIUs 210 appropriately. As will be recognized by those skilled in the art having the benefit of this disclosure, this type of scaling may impact performance or commercial feasibility. Also, there are extremes in numbers of ISUs 200 and MIUs 210 that are not feasible as a practical matter. Nevertheless, the present invention is readily scalable and the number of crossbar switches 425 in any given implementation is not material to the practice of the invention.

Figure 4:
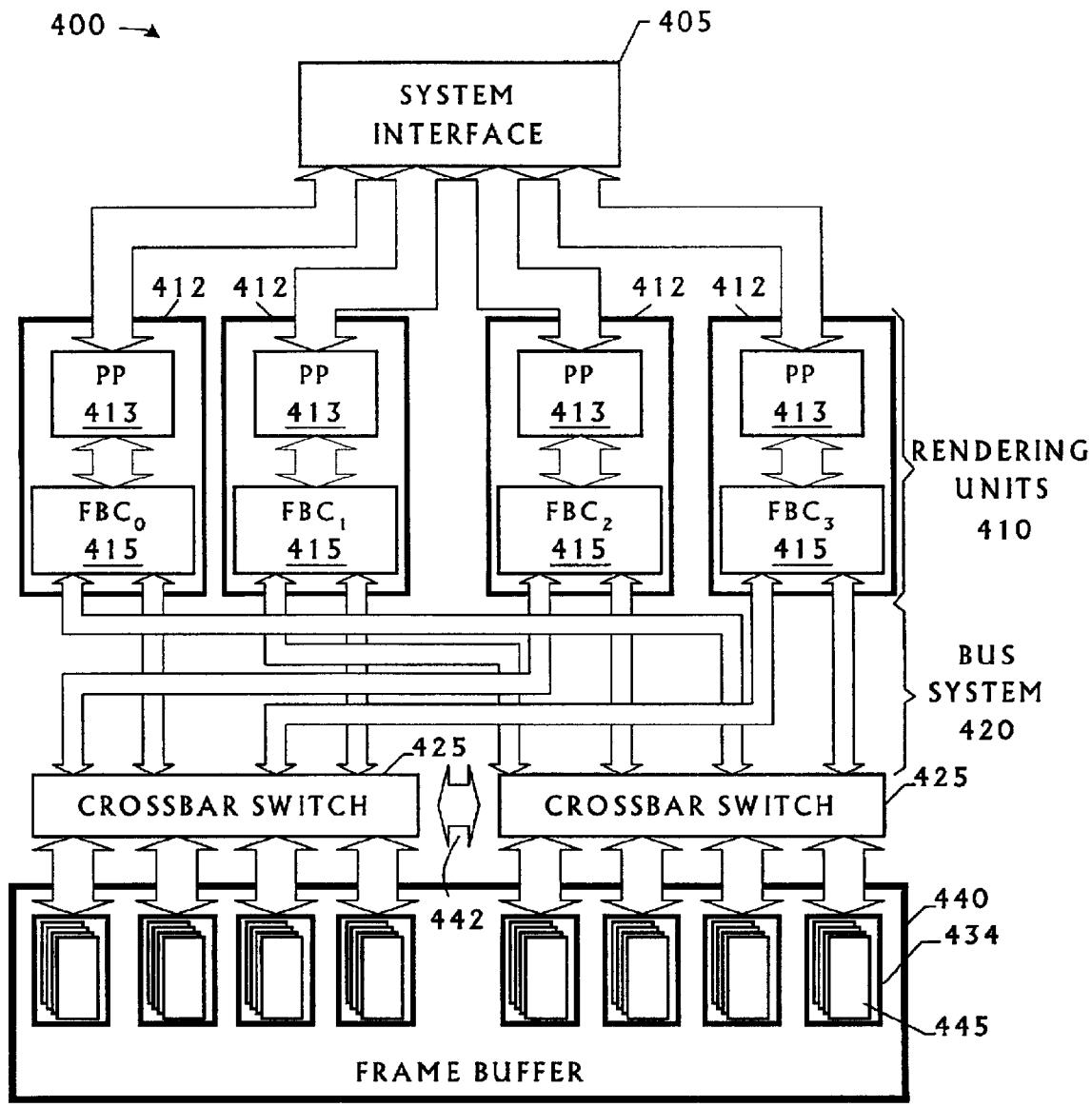
FIG. 4 depicts, in another conceptual block diagram, one particular embodiment of the memory subsystem of FIG. 1.
Figure 5A:
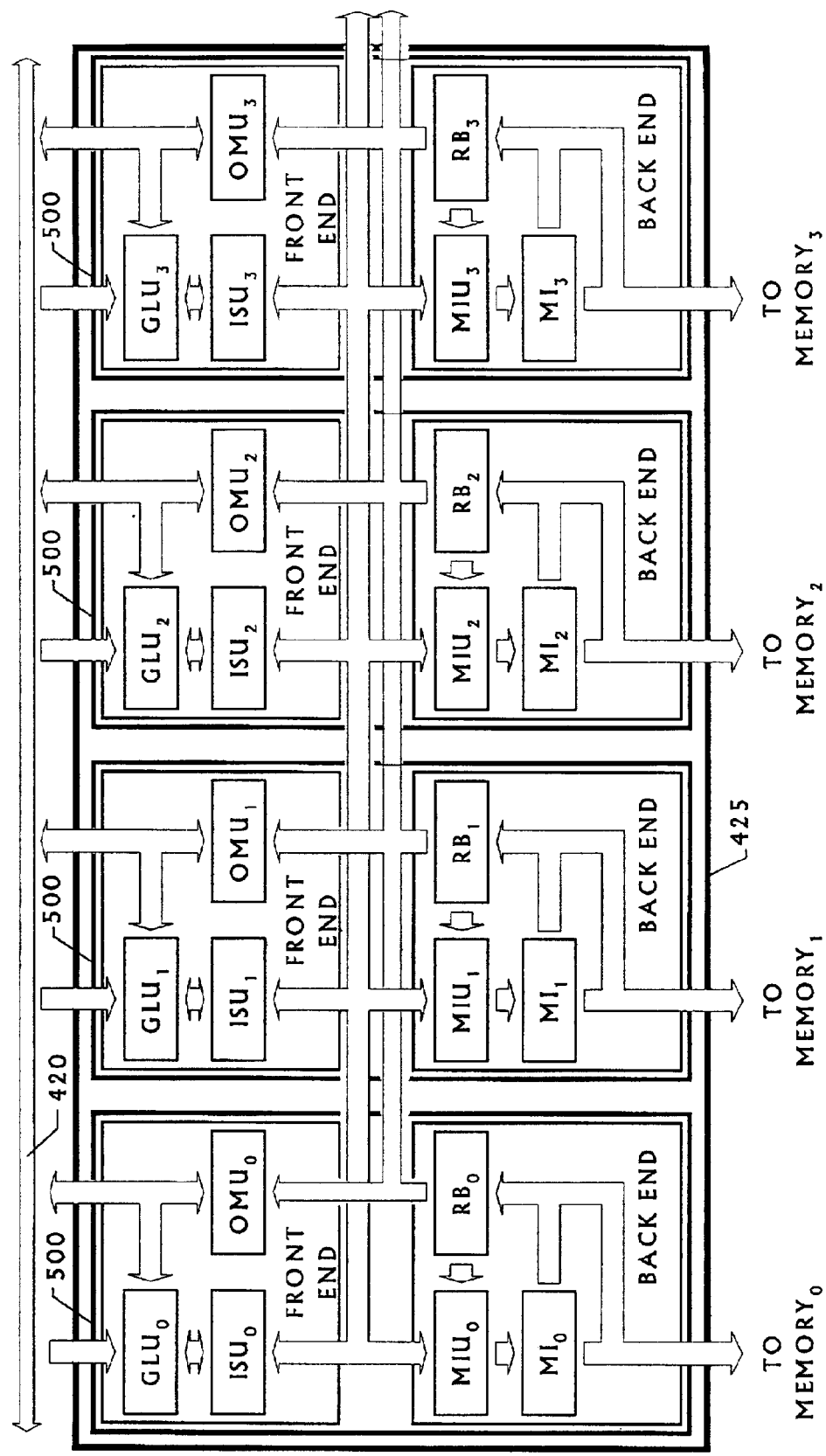
FIG. 5A depicts, in a conceptual block diagram, a crossbar switch from the embodiment of FIG. 4.
Figure 5B:
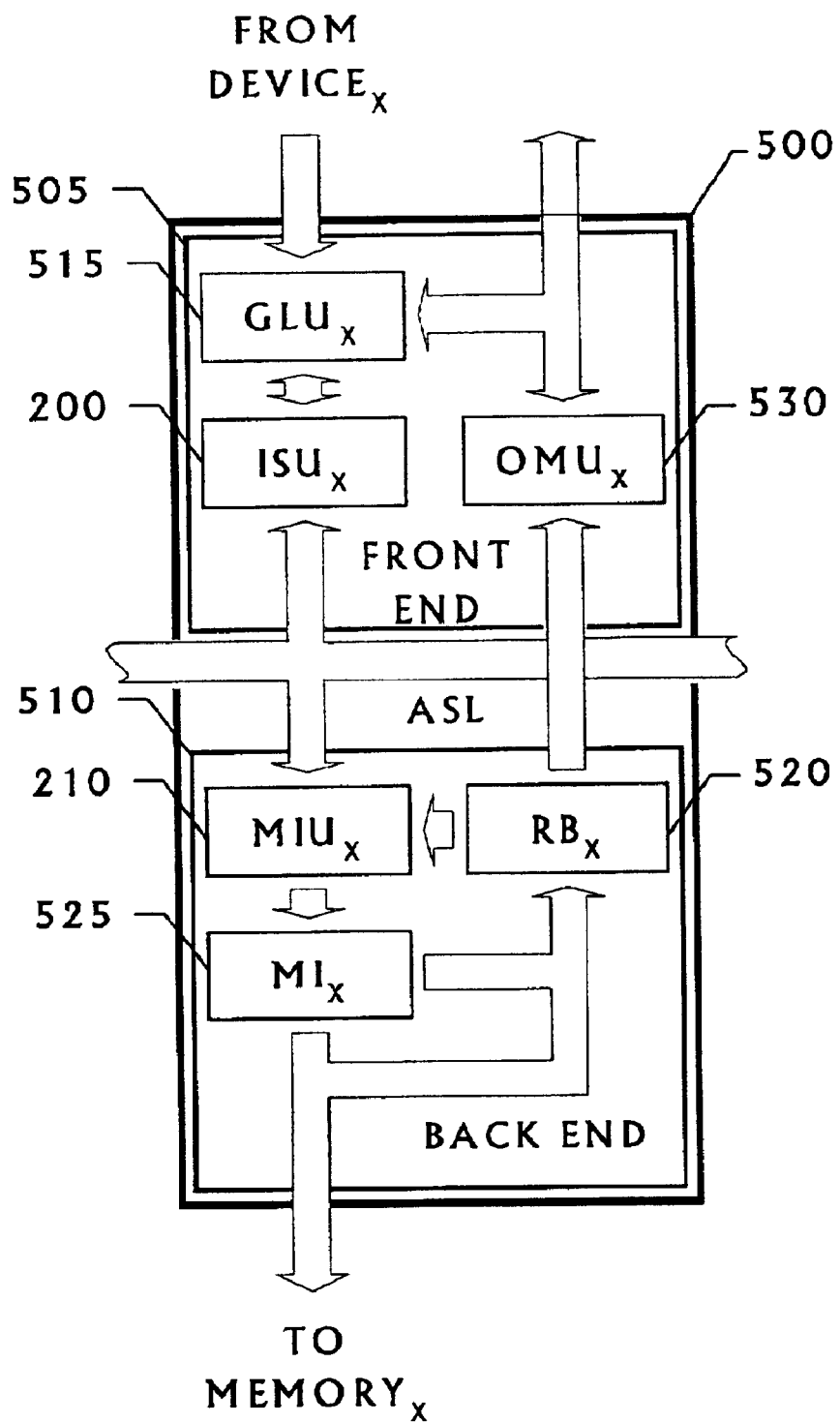
FIG. 5B illustrates the arbitration and select logic unit of the crossbar switch in FIG. 5A.

FIG. 5A illustrates the internal organization of the crossbar switches 425 of FIG. 4. Each crossbar switch 425 includes four arbitration and select logic ("ASL") units 500. Turning now to FIG. 5B, each ASL unit 500 includes a front end 505 built around an ISU 200 and a back end 510 build around a MIU 210. Each front end 505 is hardwired to each back end 510 of each crossbar switch 425 and each back end 510 of each crossbar switch 425 is, in this particular embodiment, hardwired to each front end 505 as was discussed above. More precisely, each ISU 200 is hardwired in an exclusive point-to-point connection to each MIU 210 that is not shared by any other ISU 200. This connection may be made using any suitable technique known to the art so long as the front ends 505 and back ends 510 can communicate with one another.

Each front end 505 is associated with and handles access requests generated from a particular rendering pipeline 410. Each back end 510 is associated with and handles access requests destined for a particular physical memory device 434. Thus, the front end 505 handles the interface with the rendering units 410, massages and buffers the received requests, and returns data to the rendering units 410. The back end 510 receives access requests for its respective memory device from the front ends 505, selects one from among those requests, executes the operations associated with the selected request, and returns data to the front end 505 that generated the access request.

More particularly, each front end 505 comprises a translation circuit, implemented as a Glue logic unit ("GLU") 515 in this particular implementation, and ISU 200, and an output management unit ("OMU") 530. Each back end comprises a MIU 210, a memory interface 525, and a read buffer ("RB") 520. The rendering units 410 generate access requests. The GLU 515 receives the requests intended for its respective ISU 200, massages it, and forwards it to the ISU 200. The ISU 200 receives the request, determines the destination physical memory device 434 for the request, and forwards it to the appropriate MIU 210, i.e., the MIU 210 associated with the destination physical memory device 434. The MIU 210 receives multiple, competing access requests destined for its respective physical memory 434, arbitrates among them, and selects one for implementation. The MIU 210 forwards the selected access request to the memory interface 525, which then implements the access request.

Read data returned from the physical memory device 434 is temporarily stored in the read buffer 520, until it can be transmitted to the appropriate OMU 530, i.e., the OMU 530 associated with the rendering unit 412 that originated the access request. Each RB 520 is, in this particular implementation, hardwired in an exclusive point-to-point connection with each OMU 530 that is not shared by any other RB 520. Note that this type of connection is not material to the practice of the invention and suitable alternatives may be employed in other embodiments. The OMU 530 multiplexes read data returned from the multiple physical memory devices 434 via the read buffers 520 back to the respective rendering unit 412.

Figure 6:
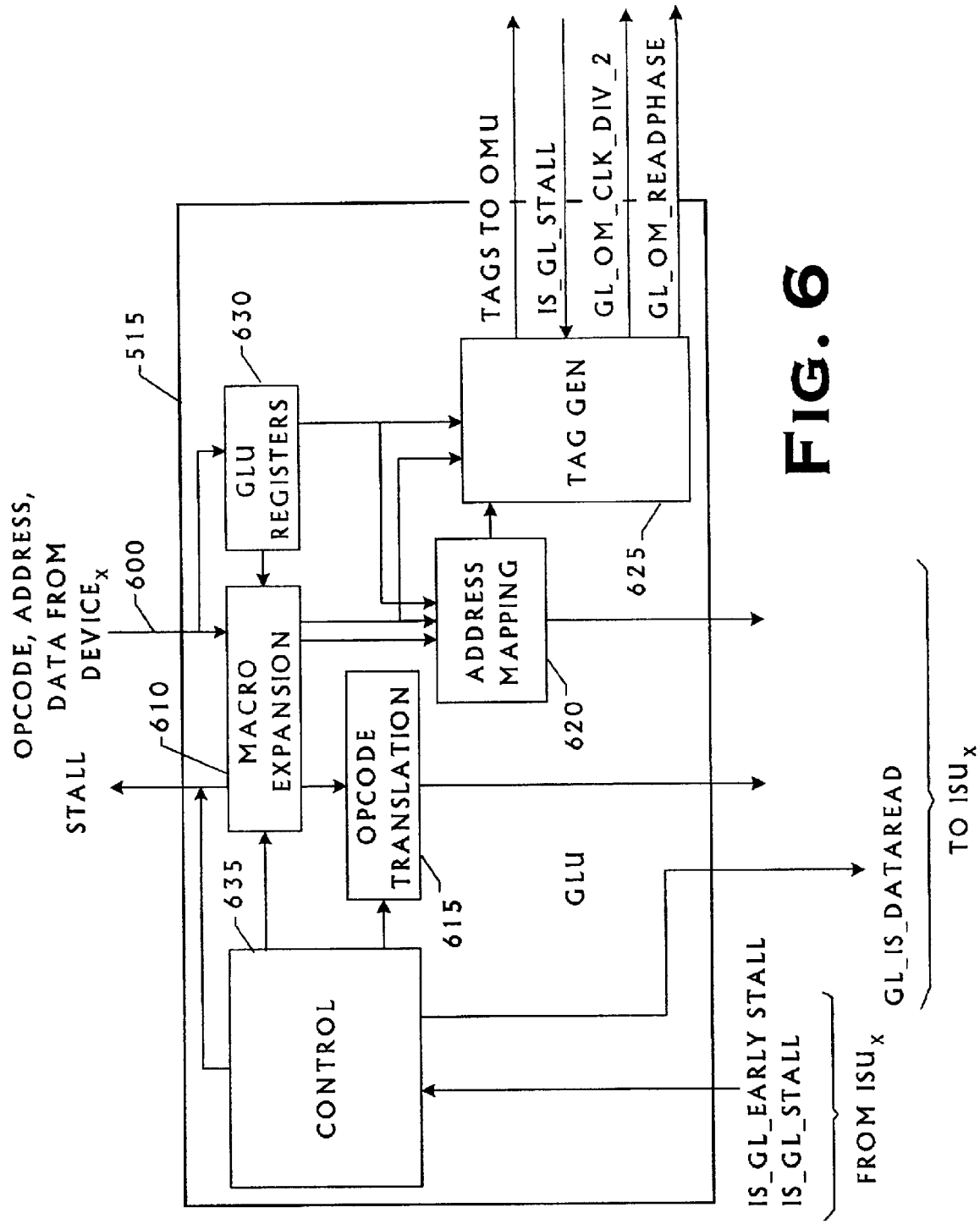
FIG. 6 illustrates the Glue logic unit of the arbitration and select logic unit of FIG. 5B.

As was mentioned above, the ISU 200 may be associated with circuitry for address determining and manipulation, which function is performed by the GLU 515. The internal organization of the GLU 515 is illustrated in FIG. 6. The GLU 515 accepts incoming requests and translates the pixel sample address in the request to a physical address. The physical address determines which of the physical memory devices 434 is to be accessed, and therefore to which one of the memory controllers 432 the request should be forwarded.

More particularly, the GLU 515 receives the requests over the bus system 420 and the line 600. As a general proposition, the GLU 515 functionality may be implemented using any technique known to the art. In the illustrated embodiment, the rendering units 412 and the frame buffer 440 use slightly different addressing scheme. The ISUs 500 employ the addressing scheme of the frame buffer 440. The principle purpose of the GLU 515 is to "translate" the addresses of the requests from the rendering units 412 into the addressing scheme of the frame buffer 440. Thus, in embodiments where the rendering units 412 and the frame buffer 440 use the same addressing scheme, the GLUs 515 can be omitted.

Returning now to FIG. 6, the request received over the line 600 includes an opcode defining the type of access (i.e. read or write), the address for the access, and any data that needs to be written if the access is a write. The macro expansion circuit 610 breaks the request down into the opcode, which is forwarded to the opcode translation circuit 615, the address, which is forwarded to the address mapping circuit 620 and the tag generating circuit 625. The data, if present, is temporarily stored in the GLU registers 630. The opcode translation and mapped address output by the circuits 615, 620 are forwarded to the ISU 500. The data is also forwarded to the ISU 500 with the mapped address through the address mapping circuit 620. The mapped address is also forwarded to the tag generator 625. The tags are output by the tag generator circuit 625 to the OMU 530 for use as is discussed further below. The control circuit 635 receives and implements the stall signals early stall and stall signals IS_GL_EARLY STALL and IS_GL_STALL, respectively, and relays the stall signal IS_GL_STALL when received.

Figure 7:
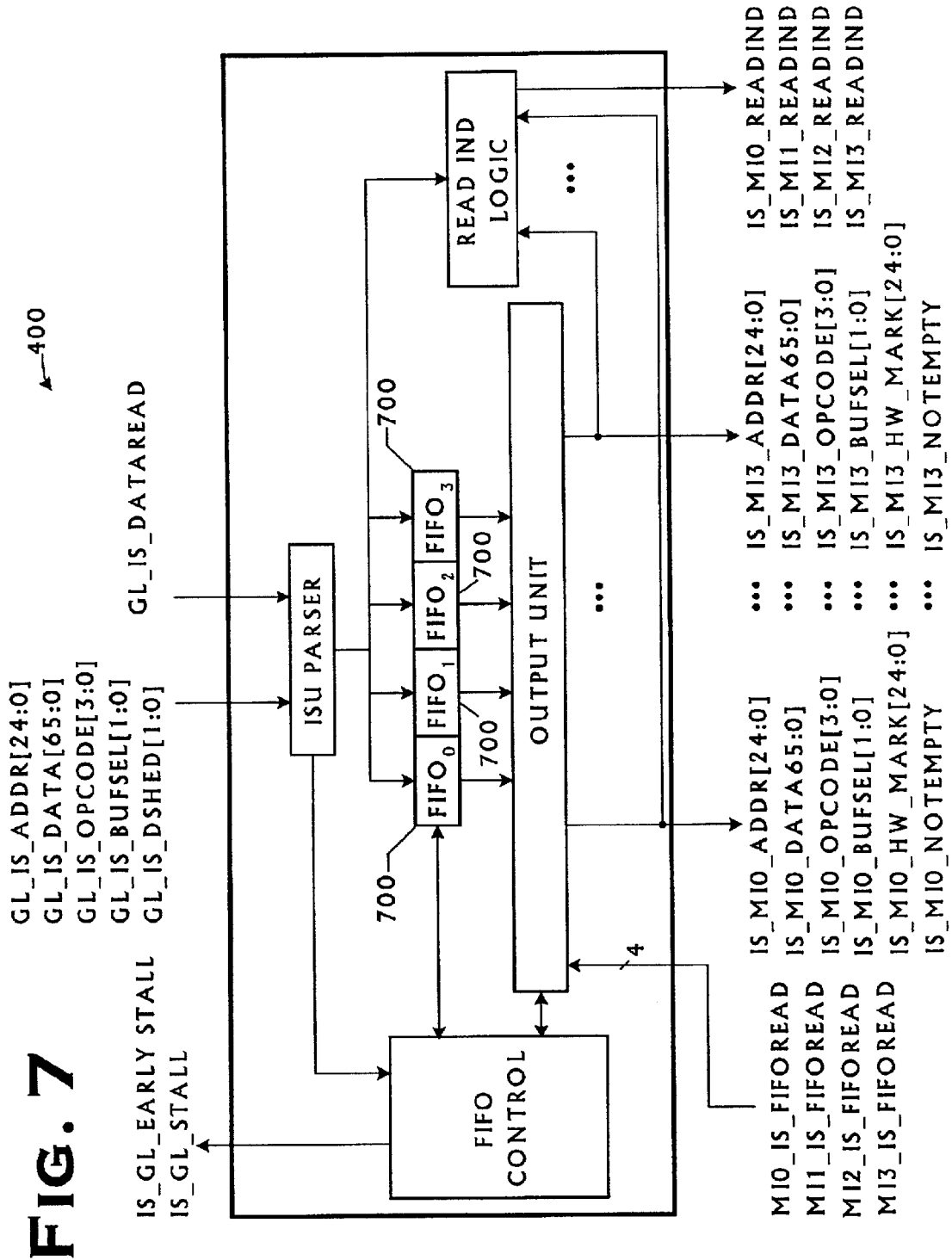
FIG. 7 illustrates the input sorting unit of the arbitration and select logic unit of FIG. 5B.

The internal organization of the ISU 200 is illustrated in FIG. 7. The ISU 200 comprises multiple identical FIFO queues 700. Note, however, that alternative implementations and alternative embodiments might employ other types of data structures. In the illustrated embodiment, the ISU 200 includes four FIFO queues 700 in which it may buffer up to four requests from its respective rendering unit 412. The ISU 200 receives the address, data, opcode, buffer select, and originating device data signals GL_IS_ADDR[24:0], GL_IS_DATA[65:0], GL_IS_OPCODE[3:0], GL_IS_BUFSEL[1:0], and GL_IS_DSHED[1:0], and the signal GL_IS_DATAREAD from the GLU 515. The signal GL_IS_DATAREAD is a control signal indicating that the GL_IS_OPCODE[3:0] signal contains a read opcode.

Figure 8:
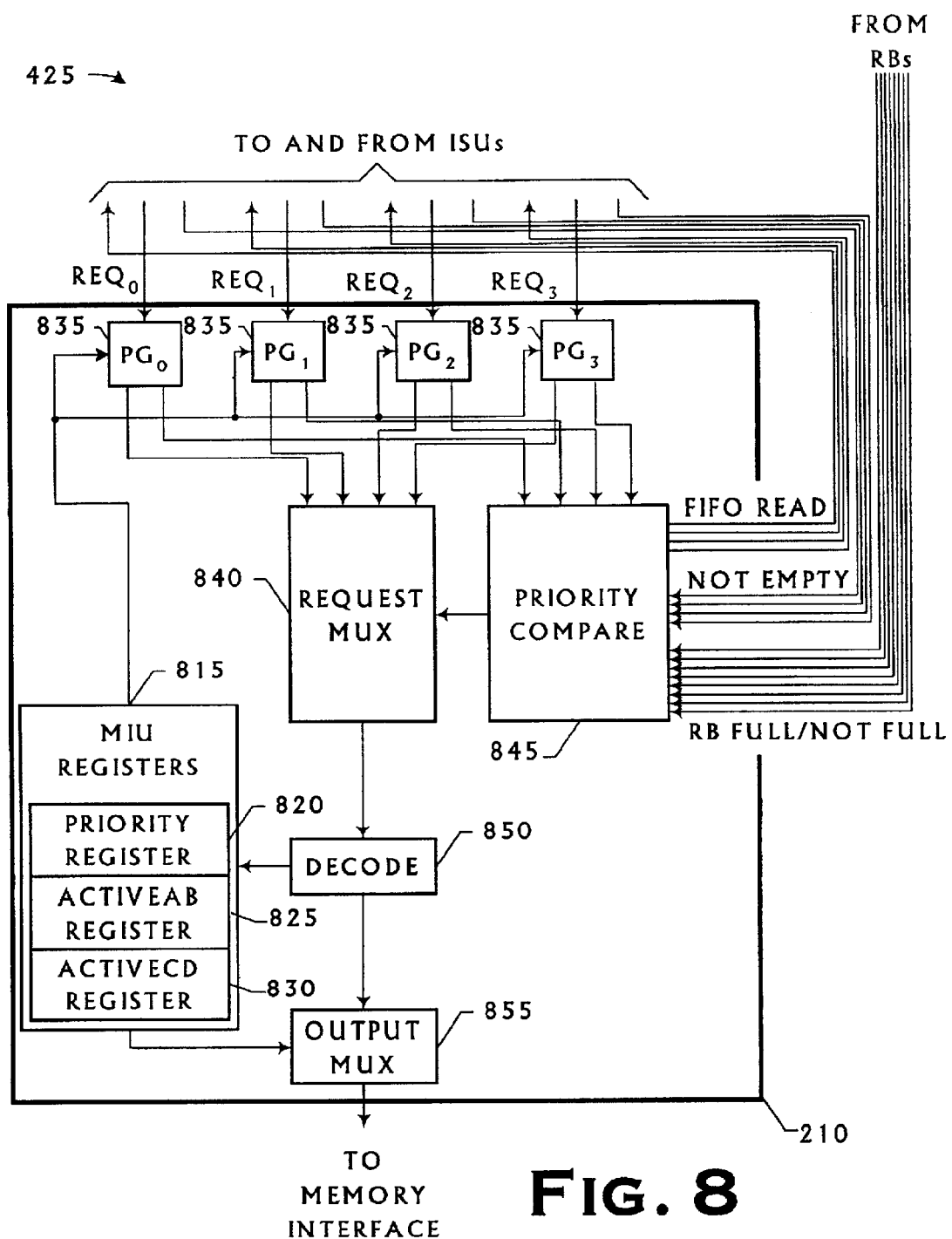
FIG. 8 illustrates the merge and interleave unit of the arbitration and select logic unit of FIG. 5B.

Turning now to FIG. 8, the MIU 210 is responsible for arbitrating among the various access requests presented to it by the various ISUs 200. The MIU 210 includes a priority generator ("PG") circuit 835, i.e., $PG_0$–$PG_3$, one for each ISU 200. The priority generator circuits 835 determine the priority for their respective access request. Although the factors contributing to good performance can be readily identified, it is not always easy to tell which are the most important in a given application. Thus, the MIU 210 in this particular implementation includes some programmable MIU registers 815. The identification, address, and functionality of each of the registers 815 is set forth in table 1 below. The selection by the MIU 210 is based on the characteristics of the requests and various operational characteristics, e.g., the status of the $ISU_0$–$ISU_3$, configuration registers (not shown), and programmed priority control determined by the content of the MIU Registers 815.

TABLE 1

MIU Programmed Priority Registers

| Register Name | Register Address | Bits | Field | Functionality |
|---|---|---|---|---|
| Priority Register | 8h'80 | [15:12] | FIFO Highwater Mark Priority | Priority weight of FIFO Highwater Mark; set to 4'h3 by reset |

TABLE 1-continued

MIU Programmed Priority Registers

| Register Name | Register Address | Bits | Field | Functionality |
|---|---|---|---|---|
| | 8h'80 | [11:8] | Page Hit Priority | Priority weight of Page Hit; set to 4'hF by reset |
| | 8h'80 | [7:4] | Bank Miss Priority | Priority weight of Bank Miss; set to 4'h3 by reset |
| | 8h'80 | [3:0] | Pending Read Priority | Priority weight of Pending Read; set to 4'h0 by reset |
| ActiveAB Register | 8h'81 | [19:18] | Current Active Bank | Contains the current active 3DRAM bank; used for scheduling purposes |
| | 8h'81 | [17:9] | Bank A Current 3DRAM Page | Contains the Bank A current active 3DRAM page number; used for scheduling purposes |
| | 8h'81 | [8:0] | Bank B Current 3DRAM Page | Contains the Bank B current active 3DRAM page number; used for scheduling purposes |
| ActiveCD Register | 8h'82 | [17:9] | Bank C Current 3DRAM Page | Contains the Bank C current active 3DRAM page number; used for scheduling purposes |
| | 8h'82 | [9:0] | Bank D Current 3DRAM Page | Contains the Bank D current active 3DRAM page number; used for scheduling purposes |

Referring now to FIG. 8 and Table 1, the MIU registers 815 include, in this particular implementation, at least three registers with multiple fields in each register. A Priority Register 820 has four fields of four bits each. Each four-bit field is set to a value which is the weight of that condition. For example, if a signal IS0_MI_HW_MARK is received from the ISU 500 $ISU_0$ and set to a 1, indication that $ISU_0$ FIFO is almost full, then the weight of or priority of this condition is the value in bit 15 to bit 12 of the Priority Register 820. An ActiveAB register 825 has three field of varying size. The bits [19:18] indicate the current DRAM bank. An ActiveCD Register 830 is structured similarly. Note that, in the present implementation, the terms "high water" and "low water" denote the fullness of the respective ISU, i.e., "high water" meaning full and "low water" meaning empty.

The ActiveAB and ActiveCD registers 825, 830 are updated after every request selection. So if a request is selected which chose bank 2 (=bank C) and page=1BF (in hex) then the bits [17:9] of the ActiveCD register 830 would be set to IBF and the bits [19:18] of the ActiveAB register 825 are set to 2. These updates occur immediately. The reason for changing banks in this particular embodiment when there is a page miss is that the DRAMS a 445 used in this particular embodiment are slower when changing pages after having been previously accessed. The active bank identifier indicates the most recently accessed bank.

Each of the ISUs 200 present a command and date packet (not shown) to the MIU 210. Each ISU 200 provides various FIFO status bits, not empty, read indicator, and high water mark information to the MIU 210 for FIFO reads and priority determination. Table 2 sets forth the content of the requests from the ISUs 200 to the MIU 210.

TABLE 2

Request Signal Content

| Signal Name | Bits | Meaning |
|---|---|---|
| IS0_MI_DATA[65:0] | 66 | Write Data bus from $ISU_0$ |
| IS0_MI_ADDR[24:0] | 25 | Address bus from $ISU_0$ |

TABLE 2-continued

Request Signal Content

| Signal Name | Bits | Meaning |
|---|---|---|
| IS0_MI_OPCODE[3:0] | 4 | Opcode from $ISU_0$ |
| IS0_MI_BUFSEL[1:0] | 2 | Buffer select from $ISU_0$ |
| IS0_MI_HW_MARK | 1 | Indicates $ISU_0$ FIFO condition of almost full, high water mark has been reached |
| IS0_MI_NOTEMPTY | 1 | Indicates $ISU_0$ FIFO condition of not empty |
| IS0_MI_READIND | 1 | Indicates $ISU_0$ FIFO condition of read operations waiting |
| IS1_MI_DATA[65:0] | 66 | Write Data bus from $ISU_1$ |
| IS1_MI_ADDR[24:0] | 25 | Address bus from $ISU_1$ |
| IS1_MI_OPCODE[3:0] | 4 | Opcode from $ISU_1$ |
| IS1_MI_BUFSEL[1:0] | 2 | Buffer select from $ISU_1$ |
| IS1_MI_HW_MARK | 1 | Indicates $ISU_1$ FIFO condition of almost full, high water mark has been reached |
| IS1_MI_NOTEMPTY | 1 | Indicates $ISU_1$ FIFO condition of not empty |
| IS1_MI_READIND | 1 | Indicates $ISU_1$ FIFO condition of read operations waiting |
| IS2_MI_DATA[65:0] | 66 | Write Data bus from $ISU_2$ |
| IS2_MI_ADDR[24:0] | 25 | Address bus from $ISU_2$ |
| IS2_MI_OPCODE[3:0] | 4 | Opcode from $ISU_2$ |
| IS2_MI_BUFSEL[1:0] | 2 | Buffer select from $ISU_2$ |
| IS2_MI_HW_MARK | 1 | Indicates $ISU_2$ FIFO condition of almost full, high water mark has been reached |
| IS2_MI_NOTEMPTY | 1 | Indicates $ISU_2$ FIFO condition of not empty |
| IS2_MI_READIND | 1 | Indicates $ISU_2$ FIFO condition of read operations waiting |
| IS3_MI_DATA[65:0] | 66 | Write Data bus from $ISU_3$ |
| IS3_MI_ADDR[24:0] | 25 | Address bus from $ISU_3$ |
| IS3_MI_OPCODE[3:0] | 4 | Opcode from $ISU_3$ |
| IS3_MI_BUFSEL[1:0] | 2 | Buffer select from $ISU_3$ |
| IS3_MI_HW_MARK | 1 | Indicates $ISU_3$ FIFO condition of almost full, high water mark has been reached |
| IS3_MI_NOTEMPTY | 1 | Indicates $ISU_3$ FIFO condition of not empty |
| IS3_MI_READIND | 1 | Indicates $ISU_3$ FIFO condition of read operations waiting |

Note that, in this particular implementation, the MIU 210 should give a higher priority to an ISU 200, indicating it has read operations pending. This is because the FBCs in the rendering pipelines 410 (shown in FIG. 4) used in this particular implementation cannot perform any writes until the last read is completed. Thus, the MIU 210 should dispatch read operations as quickly as possible to avoid holding up the FBC 415 that has issued the read. The ISU 200 uses one of its condition code bits to indicate it has read operations in its FIFO. However, this is not necessary to the invention. Recall that earlier it was stated that determining priority will to some degree be implementation specific, and this is one example of such.

The MIU 210 also receives read buffer ("RB") high water signals and low water mark signals from the associated RBs 520 shown in FIG. 5. The RBs 520 buffer read memory data returned from the memory interface 535. The high water mark signals indicate that the respective RBs 520 are almost full and that the MIU 210 should stop selecting requests from the ISU 200. The low water mark signals indicate that the respective RBs 520 are almost empty and the MIU 210 may start selecting requests from that ISU 200 again. Table 3 shows the RB read data FIFO almost full signals RB_MI_HW_MARK[3:0] and the RB read data FIFO almost empty signals RB_MI_LW MARK[3:0}.

TABLE 3

Inputs from Read Buffers

| Signal Name | Bits | Meaning |
| --- | --- | --- |
| RB_MI_HW_MARK[3:0] | 4 | RB data queue[3:0] is almost full. Stop selecting from corresponding ISU. Each bit corresponds to one RB queue. |
| RB_MI_LW_MARK[3:0] | 4 | RB data queue[3:0] is almost empty. Can select from the corresponding ISU again. Each bit corresponds to one RB queue. |

The MIU 210 in this implementation is designed to:

dispatch one request each cycle from either the same ISU 200 or a different ISU 200;

consider up to six factors for each request in the selection process; and allow programmable priority control of each of these factors.

Still referring to FIG. 8, in addition to the MIU registers 815 discussed earlier, the MIU 210 also includes a priority generator ("PG") circuit 835 for each ISU 200 (i.e., PG$_0$–PG$_3$), a request multiplexer ("MUX") 840, a priority compare 845, a decode unit 850, and an output multiplexer ("MUX") 855. In the MIU 210:

the priority generator circuit 835 determine the composite priority of its respective request;

the compare priority module 845 compares the composite priority from all four priority generator circuit 835 and controls the request MUX 840 to select the request that is to be processed;

the decode unit 850 examines the selected request to determine if it is a MIU register 815 operation and, if so, sends the needed control signals and data to the MIU registers 815; and the output MUX 855 combines possible MIU register read data with other request data to be sent to the memory interface 535.

In this implementation, each of the priority generator circuit 835, the compare priority module 845, the request MUX 840, the decode unit 850, the MIU registers 815, and the output MUX 855 are implemented using digital logic circuits. Similarly, the ISUs 200 and the RBs 520 are also implemented as digital logical circuits.

Figure 9:
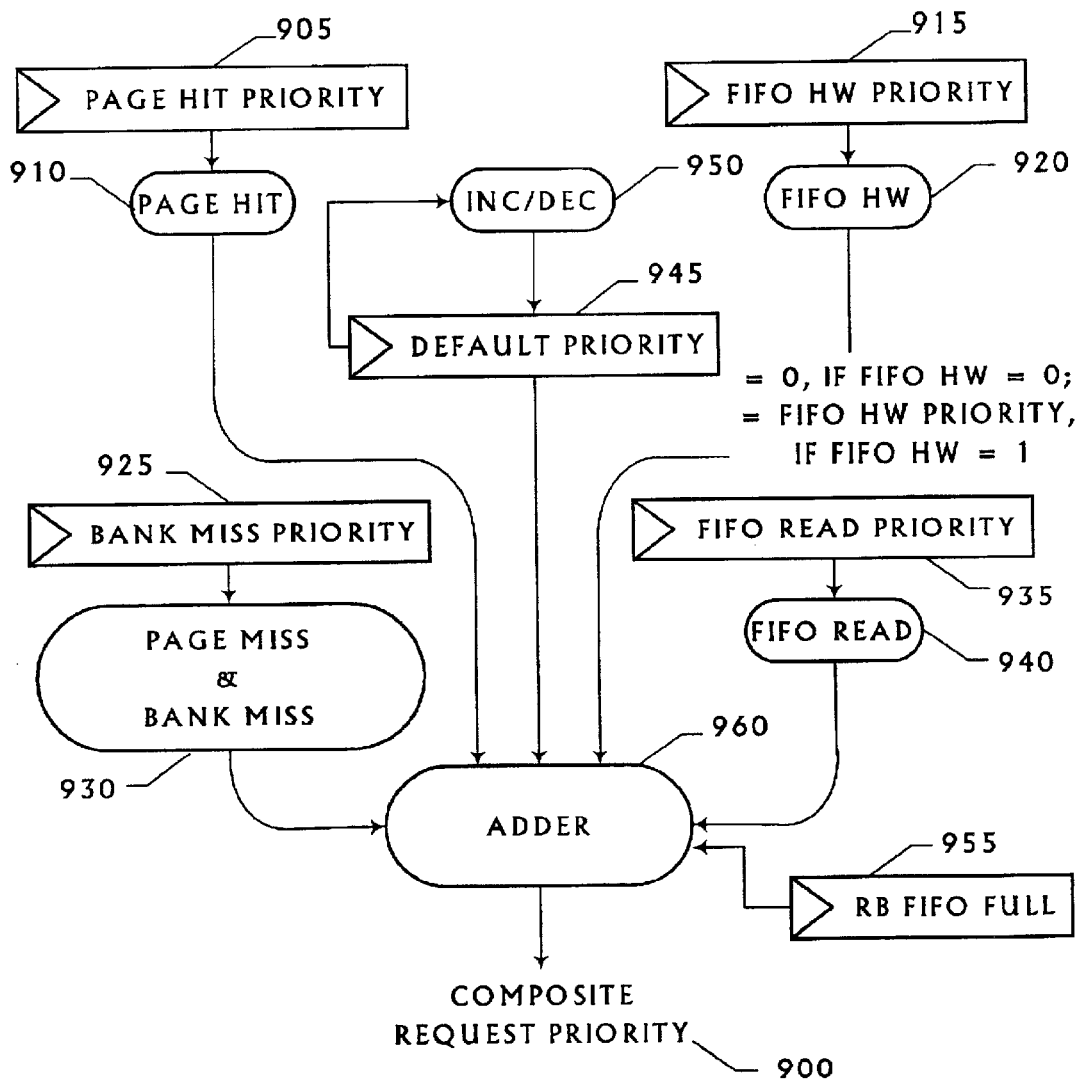
FIGS. 9–11 illustrate the process by which the arbitration and selection logic, in the particular embodiment of FIGS. 4, 5A, and 5B, arbitrates and selects one access request to a shared memory from among multiple contenders in accordance with the present invention.

FIG. 9 illustrates how the priority of each composite request priority 900 is determined by the PGs 835. The six factors considered in this implementation are:

Page Hit Priority 905—it is desirable to stay within the same page, so requests going to the same page get a higher priority. By looking at the address bits from the ISU 200, the requested bank and the page address can be determined. Then, the requested page address is compared to the current active page address of the requested bank. If the two match, then there is a page hit 910.

FIFO HW 915—if a FIFO is near full, then it needs higher priority of access. The ISU 200 FIFO HW signal 920 indicates if its FIFO is almost full.

Bank Miss 925—if there is a page miss, then it would be desirable to change banks, so requests going to a different bank get a higher priority 930. If there is no page hit, then the requested bank is compared to the current active bank identified in the ActiveAB Register 825 (shown in FIG. 8).

FIFO Read Indicator 935—if reads are pending, then that FIFO needs a higher priority 940.

Default Priority 945—a default priority is assigned when a request is first presented in the event none of the other factors applies. If the request is carried over from a previous cycle, the default priority may also be carried over from a previously determined composite request priority. If the request from an ISU 200 is not selected, then its priority should be incremented 950 so that it will be more likely to be selected in the next cycle. If the request of an ISU 200 is selected, then the default priority should be decremented 950 so that requests from other ISUs 200 may be selected.

RB FIFO Full 955—acts as a disable, setting any priority to 0 if the RB FIFO 435 is full, regardless of any other input to the adder 960. If the respective RB FIFO 520 for the ISU 200 is full, then that ISU 200 should not be selected until the RB FIFO 520 can be cleared out. Once the ISU 200 is excluded from the selection process, only a corresponding RB low water mark signal will release the exclusion.

The adder 960 then sums the six factors. Note that the above is for pixel operation requests only. For operations unrelated to pixel operations, e.g., write/read registers, the priority is determined by FIFO HW+FIFO Read Indicator+Default Priority.

More particularly, each of the factors 905, 915, 925, 935, 945, 955 has a programmable priority associated therewith and stored in a field of one of the MIU registers 815 as was discussed above. The programmable priority is a weight that is attributed to that factor. If that factor is true for a given request, then the priority of the request is increased by the weight assigned to that factor. For each request, all of the associated weights are summed by the adder 960 to form the composite priority of that request. There is also the default priority 945 for each request. The default priority is initialized to zero during reset as well as anytime the NotEmpty flag is deasserted. Thereafter, this default priority 945 is incremented every fourth time the ISU 200's request is not selected. The default priority 945 is decremented by two each time the request is selected, unless the priority is 1 or 0. In that case, the priority is not changed.

Figure 10:
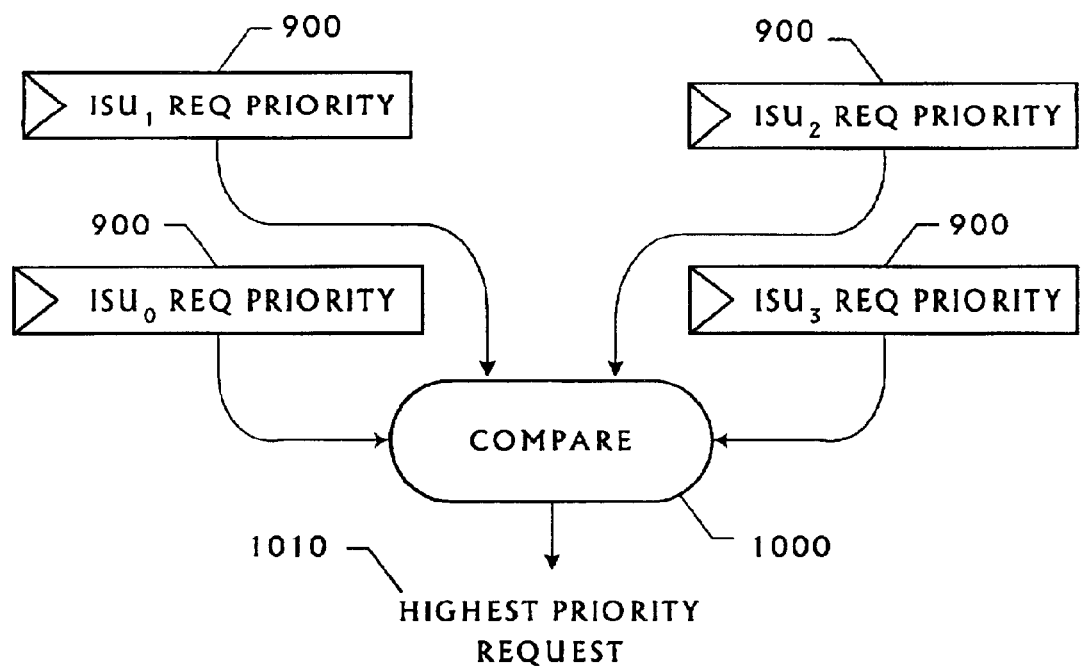
Figure 11:
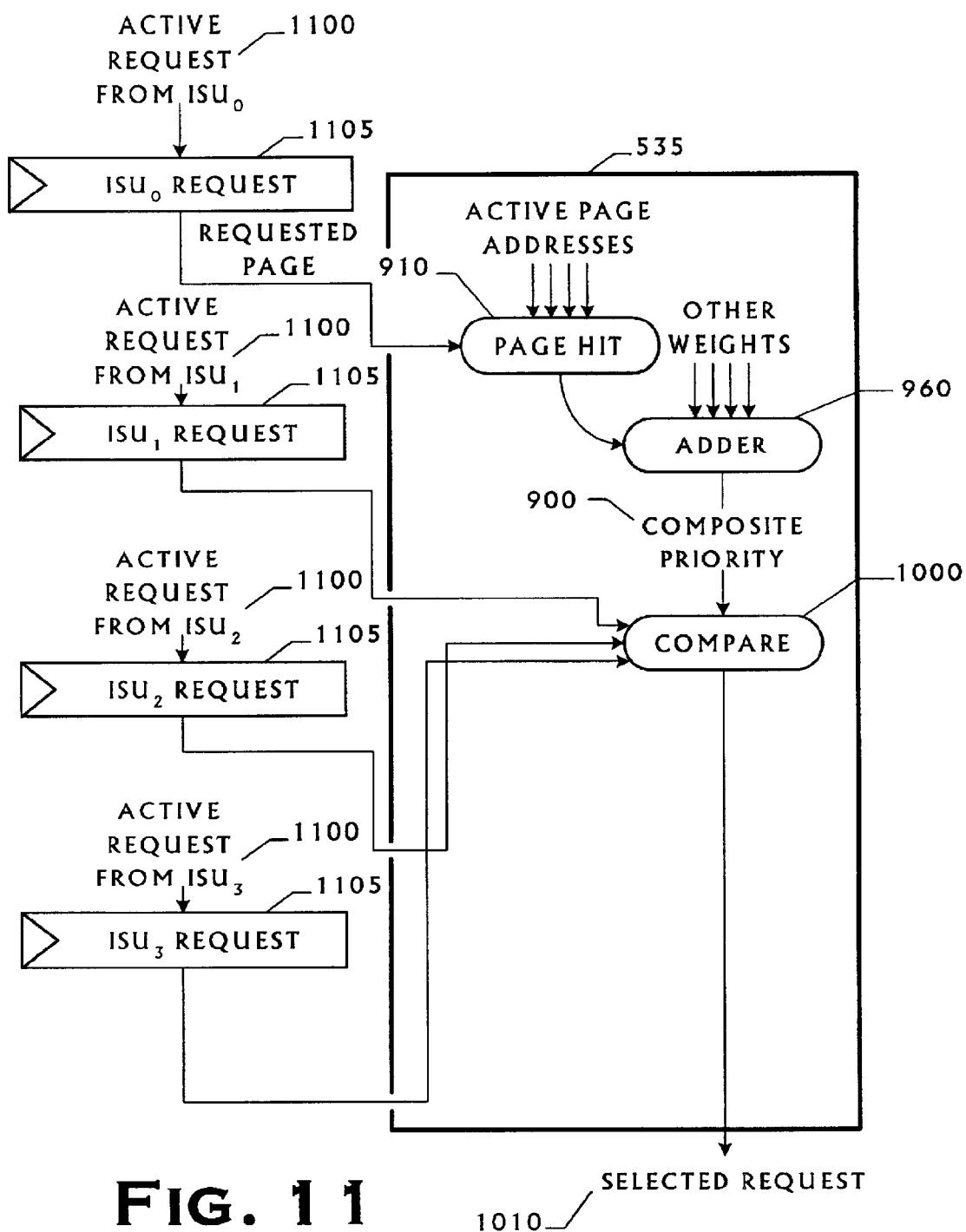

FIG. 10 illustrates the four composite request priorities 960 being compared against each other by a comparator 1000 to determine a highest composite priority request 1010. In the event of a tie, the number of the ISU 200 is used to select the request. For example, if the request for the $ISU_2$ ties with the request for the $ISU_3$, the request for the $ISU_3$ will be selected because 3>2. The comparison is an arithmetic compare and is completed in less than one clock cycle. FIG. 11 illustrates the selection of one request 1100 (in the illustrated instance, from the $ISU_0$) in a single clock cycle. Note that, in this particular embodiment, the active requests 1000 are buffered in request registers 1105. The request registers 1105 are used to hold the signals from the ISUs 500 because of the relatively high frequency at which the logic is operating, i.e., 180 MHz. At higher frequencies, register are also used to re-synchronize signals. Otherwise the varying delay of each signal would cause the signals to be out of sync with each other. The composite request priority 900 for each ISU 200 request is determined in the priority generator 835 and then compared against the other three composite request priorities 900. As will be appreciated by those in the art having the benefit of this disclosure, not every cycle will have four active requests presented.

Thus, the MIU 210 selects one of the four valid packets to be processed based on a programmable priority mechanism. The selected packet is dispatched to the memory interface 535. The MIU 210 also sends a FIFO read signal to the ISU 200 generating the selected request to indicate that the request has been dispatched and that the ISU should present another request if one is available. Table 4 shows the four FIFO read acknowledgement signals sent back to the ISUs 200

TABLE 4

Acknowledgements Output to Input Sorting Units

| Signal Name | Bits | Meaning |
| --- | --- | --- |
| MI_IS0_FIFOREAD | 1 | FIFO read signal to $ISU_0$ |
| MI_IS1_FIFOREAD | 1 | FIFO read signal to $ISU_1$ |
| MI_IS2_FIFOREAD | 1 | FIFO read signal to $ISU_2$ |
| MI_IS3_FIFOREAD | 1 | FIFO read signal to $ISU_3$ |

Figure 12:
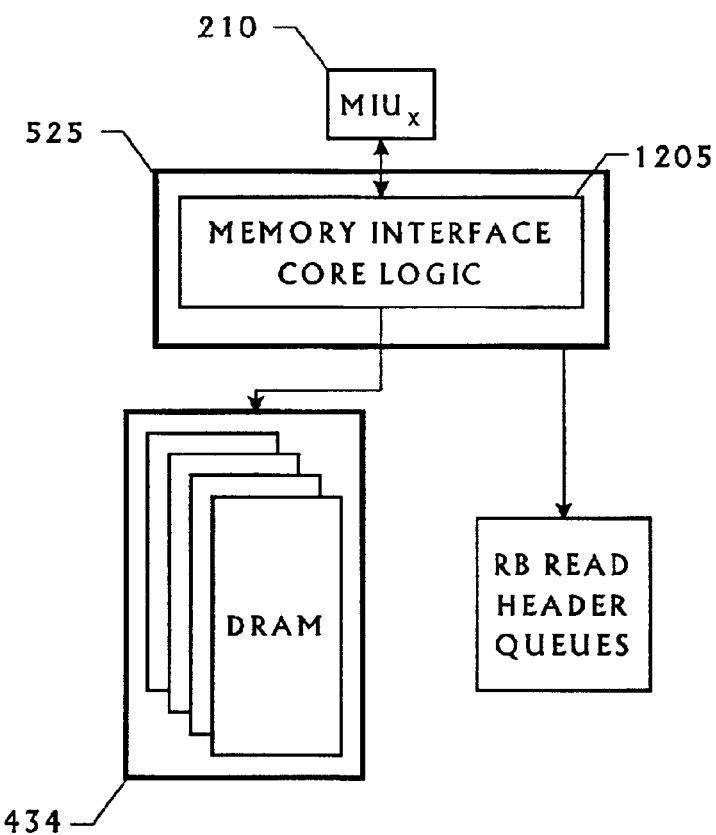
FIG. 12 illustrates the memory interface of the arbitration and select logic unit of FIG. 5B.

The request selected by the MIU 210 is forwarded to the memory interface 525. FIG. 12 illustrates the internal organization of the memory interfaces 525. Note that, in this particular embodiment, the memory interface 525 includes a memory interface core logic 1205 that maps the addresses into the physical memory device 434. Note, however, that in alternative embodiments, the memory interface may be implemented using any suitable technique known to the art.

Figure 13:
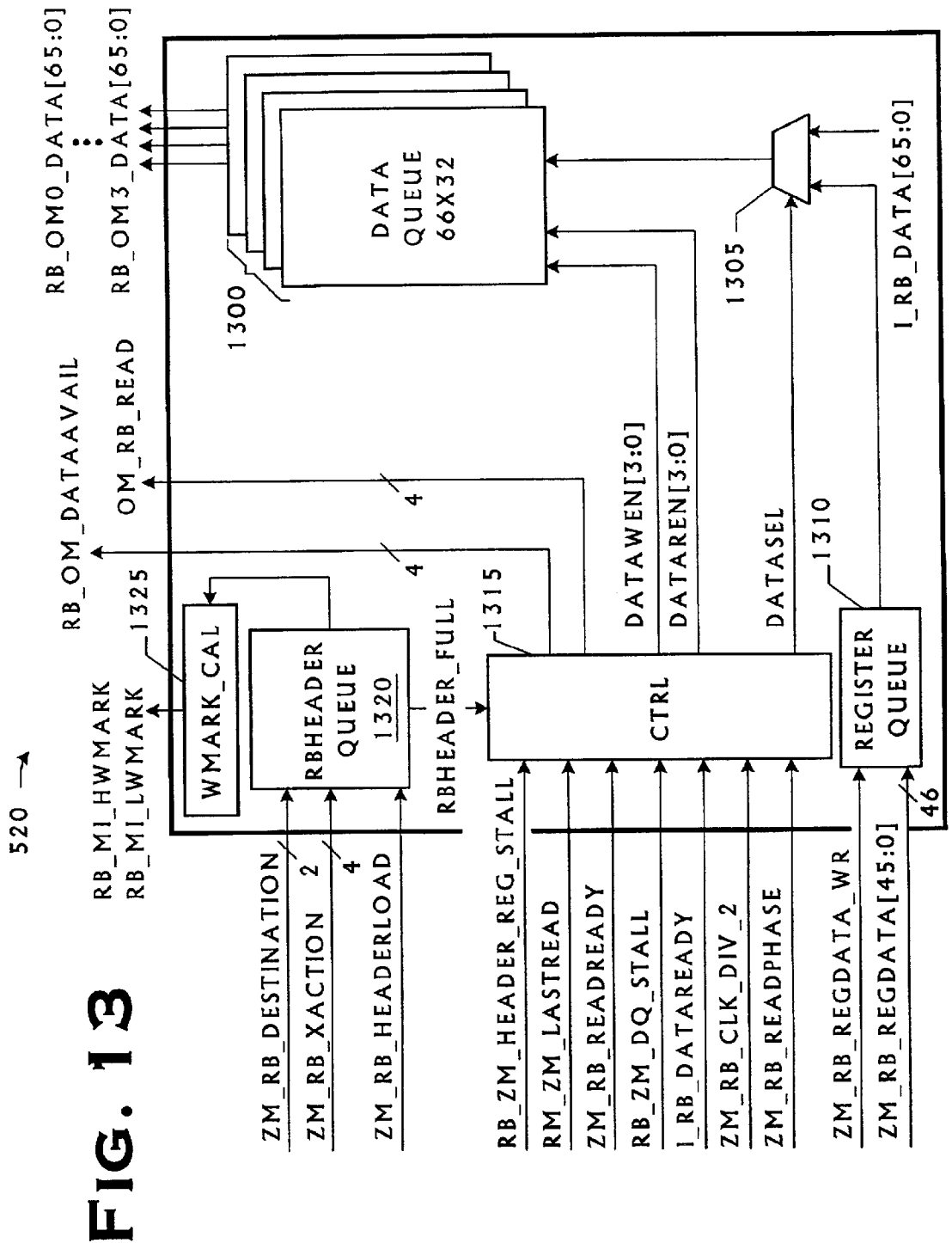
FIG. 13 illustrates the read buffers of the arbitration and select logic unit of FIG. 5B.

Returned read data is stored in the read buffers 520. FIG. 13 illustrates the internal organization of the read buffers 520. The four data queues 1300 receive data via a MUX 1305 from the physical memory device 434 (shown in FIG. 12, the signals I_RB_DATA[65:0]) or the register queue 1310 and outputs data to the OMUs 530 (RB_OM0_DATA [65:0], RB_OM1_DATA[65:0], RB_OM2_DATA[65:0], RB_OM3_DATA[65:0]). The control circuit 1315 enables the data queues 1300 (DATAWEN[3:0], DATAREN[3:0]), selects the data input for the MUX 1305 (DATASEL), and indicates to the OMU 530 that data is available for reading (RB_OM_DATAVAIL, OM_RB_READ). The RB header queue 1320 indicates to the control circuit 1315 when it is full (RBHEADER_FULL) provides information to the WMARK_CAL circuit 1325. The WMARK_CAL circuit 1325 then generates the RB_MI_HWMARK and RB_MI_LWMARK signals indicating when the read buffer 520 is about to be full or empty, respectively.

Figure 14:
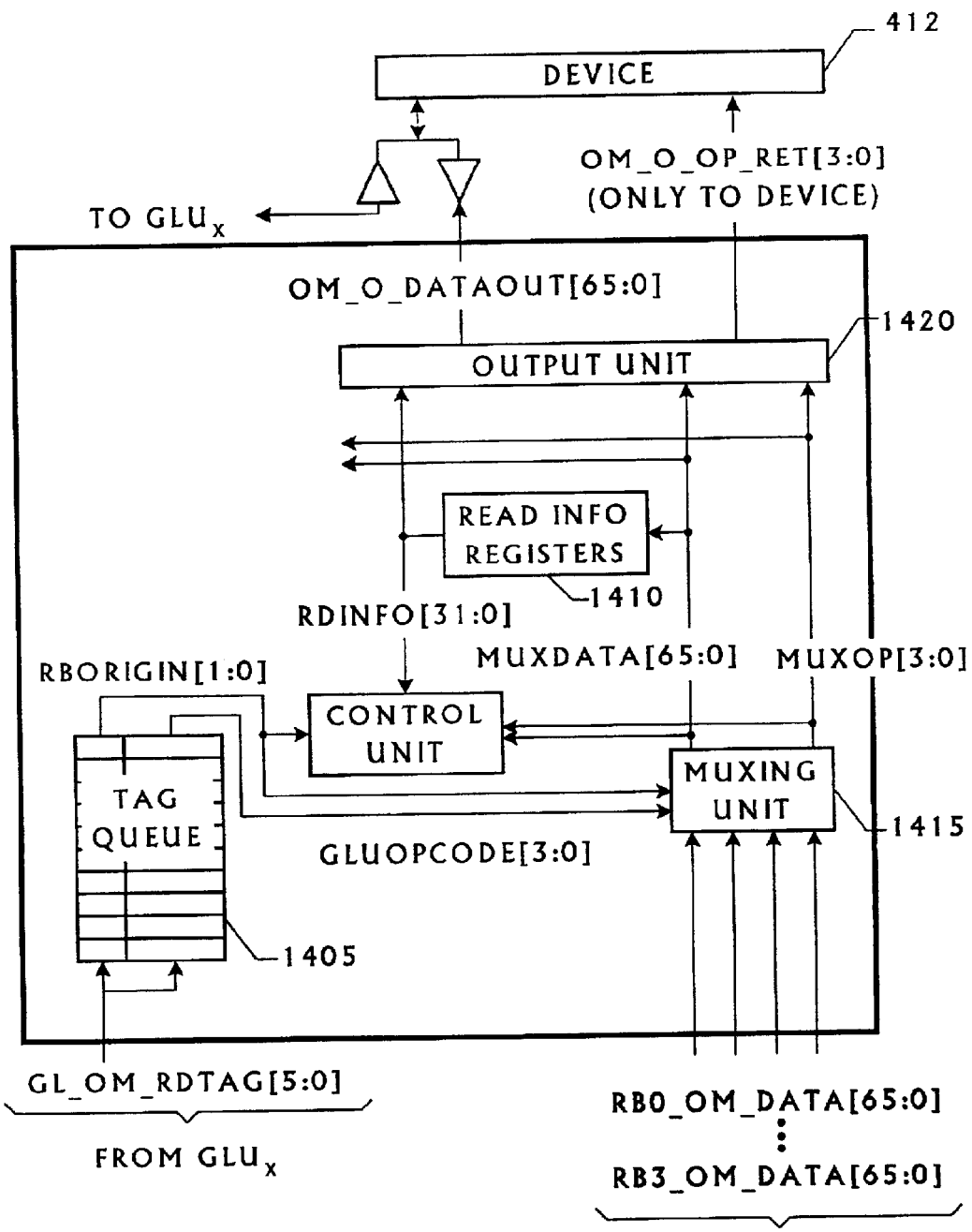
FIG. 14 illustrates the output management unit of the arbitration and select logic unit of FIG. 5B.

The read buffers 520 forward the stored read data to the OMUs 530. FIG. 14 illustrates the internal organization of the OMUs 530. In this particular embodiment, the memory interface 525 forwards the source tags received from the ISU 500 via the MIU 510 to the read buffers 520. The source tags permit the read buffers 520 to determine which rendering pipeline made the original read request. The OMU 530 stores the tags in the tag queue 1405, a FIFO queue. The tags are used by the control unit 1410 and the muxing unit 1415 to coordinate output to the device 412 through the output unit 1420. The OMU 530 multiplexes the possible read buffer data for returning data to the appropriate rendering pipeline.

More particularly, each OMU 530 receives GL_OM_RDTAG[5:0] from the respective GLU 515. This 6 bit tag is composed of 2 upper bits, [5:4] which indicates which read buffer 520 the read data is to come from, and 4 lower bits [3:0] which indicate what type of read opcode made the original request. The opcode is also returned to the rendering unit 410 along with the read data so the rendering unit 410 can track which read operation the data belongs to.

The crossbar switch 425 returns the read data in the original order of request. The tag queue 1405 is the mechanism by which request order can be tracked by the OMU 530. The GLU 515 sends a tag to the OMU 530 for each read type of opcode received in the order in which it was received. The OMU 530 looks at the output of the tag queue 1405 to decide which read buffer data to read next. In this way, the read data is returned in the same order as originally requested.

For example, if the GLU 515 receives a read request for data that will map to $MI_1$ followed by a read request for data which will map to $MI_3$, then the GLU 515 will send a RDTAG[5:4] of 1 to the OMU 530 followed by a RDTAG [5:4] of 3. The $MI_1$ and $MI_3$ will return the read data to $RB_1$ and $RB_3$, respectively. However, the $MI_3$ may perform the read faster than $MI_1$, so the $RB_3$ may indicate to the OMU 530 that data is available. But the OMU 530 will look at the tag queue 1405 output and realize that the next read data should be from the $RB_1$. So, the $RB_3$ data will not be taken until $RB_1$ indicates read data is available. Then $RB_1$ data and the read opcode type, RDTAG[3:0], are selected and sent to the output unit 1420 for transmission to the respective device 412. The following tag queue 1405 output will indicate that the next read data should be from $RB_3$. The $RB_3$ data is already available and will then be selected by OMU 530 for transmission back to the rendering unit 410.

Some portions of the detailed descriptions herein are consequently presented in terms of a software implemented process involving symbolic representations of operations on data bits within a memory in a computing system or a computing device. For example, the embodiment illustrated in FIGS. 4–12 employs programmable registers. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A crossbar switch, comprising:
   a plurality of input sorting units, each input sorting unit capable of receiving from a respective device an access request to any one of a plurality of physical memory devices;
   a plurality of merge and interleave units, each merge and interleave unit capable of arbitrating among competing access requests received from any of the input sorting units, selecting one of the competing access requests and forwarding the selected request for implementation on a respective memory device;
   wherein each merge and interleave unit includes:
      a priority generator for each input sorting unit capable of generating a composite request priority from a plurality of characteristics of the access requests and a plurality of operational characteristics;
      a priority compare circuit capable of selecting one access request;
      a request multiplexer controlled by the priority compare circuit to output the selected access request;
      a plurality of programmable registers;
      a decode unit receiving the selected request from the request multiplexer to determine whether the selected request is a register operation and, if so, to send a plurality of control and data signals to the registers; and
      an output multiplexer for combining register read data with request data for output.

2. The crossbar switch of claim 1, further comprising a plurality of translation circuits and wherein each of the input sorting units receives the access requests through a respective one of the translation circuits.

3. The crossbar switch of claim 2, wherein each of the translation circuits is capable of receiving an opcode and a virtual address from their respective device, translating the opcode to determine whether the access request is a read or a write, and mapping the virtual address into a physical address, and forwarding the translated opcode and mapped physical address to its respective input sorting unit.

4. The crossbar switch of claim 1, wherein each of the input sorting units includes a buffer and is capable of buffering the access requests from its respective physical memory device.

5. The crossbar switch of claim 4, wherein the buffer is a first-in, first-out queue.

6. The crossbar switch of claim 4, wherein each of the input sorting units is capable of stalling its respective device when its buffer is full.

7. The crossbar switch of claim 1, wherein each merge and interleave unit further includes:
   the priority generator for each input sorting unit being further capable of:
      receiving the plurality of characteristics for the access request received by the input sorting unit;
      receiving the plurality of operational characteristics; and
      generating the composite request priority from the characteristics of the access requests and the operational characteristics;
   the priority compare circuit being further capable of:
      comparing the composite request priorities generated by the priority generators; and
      selecting the one access request predicated on the comparison of the composite request priorities.

8. The crossbar switch of claim 1, further comprising:
   a plurality of read buffers capable of receiving and buffering read data from a respective one of the physical memory devices; and
   a plurality of output management units capable of receiving read data from the read buffers and forwarding the received read data to a respective one of the devices that generated the access request associated with the read data.

9. The crossbar switch of claim 1, further comprising a plurality of memory interfaces capable of receiving the selected access request from a respective one of the plurality of merge and interleave units and forwarding the selected access request to a respective one of the physical memory devices.

10. A crossbar switch, comprising a plurality of arbitration and select units, each arbitration and select unit including:
   a plurality of front ends, each front end comprising:
      a translation circuit capable of processing an access request received from a respective device;
      an input sorting unit capable of buffering and forwarding the processed access request;
      an output management unit capable of receiving read data generated by the access request and forwarding the received read data to the respective device; and
   a plurality of back ends, each back end comprising:
      a merge and interleave unit capable of arbitrating among competing access requests received from any of the input sorting units, selecting one of the competing access requests, and forwarding the selected request for implementation on a respective memory device;
      wherein each merge and interleave unit includes:
         a priority generator for each input sorting unit capable of generating a composite request priority from a plurality of characteristics of the access requests and a plurality of received operational characteristics;
         a priority compare circuit capable of selecting one access request;
         a request multiplexer controlled by the priority compare circuit to output the selected access request;
         a plurality of programmable registers;

a decode unit receiving the selected request from the request multiplexer to determine whether the selected request is a register operation and, if so, to send a plurality of control and data signals to the registers; and an output multiplexer for combining register read data with request data for output; and a read buffer capable of receiving, buffering, and forwarding read data received from the respective memory device to the output management unit of the front end that issued a previously selected access request that generated the read data.

11. The crossbar switch of claim 10, wherein each back end further comprises a memory interface through which the merge and interleave unit forwards the selected request.

12. The crossbar switch of claim 10, wherein each of the translation circuits is capable of receiving an opcode and a virtual address from their respective device, translating the opcode to determine whether the access request is a read or a write, and mapping the virtual address into a physical address, and forwarding the translated opcode and mapped physical address to its respective input sorting unit.

13. The crossbar switch of claim 10, wherein each of the input sorting units includes a request buffer and is capable of buffering the access requests from its respective physical memory device.

14. The crossbar switch of claim 13, wherein the request buffer is a first-in, first-out queue.

15. The crossbar switch of claim 13, wherein each of the input sorting units is capable of stalling its respective device when its request buffer is full.

16. The crossbar switch of claim 10, wherein each merge and interleave unit further includes:

the priority generator for each input sorting unit being further capable of:
  receiving the plurality of characteristics for the access request received by the input sorting unit;
  receiving the plurality of operational characteristics; and
  generating the composite request priority from the characteristics of the access requests and the operational characteristics;

the priority compare circuit being further capable of:
  comparing the composite request priorities generated by the priority generators; and
  selecting the one access request predicated on the comparison of the composite request priorities.

17. A crossbar switch, comprising a plurality of arbitration and select units, each arbitration and select unit including:

a plurality of front ends, each front end further including an input sorting unit capable of receiving from a respective device an access request to any one of a plurality of physical memory devices;

a plurality of back ends, each back end further including merge and interleave unit capable of arbitrating among competing access requests received from any of the input sorting units, selecting one of the competing access requests and forwarding the selected request for implementation on a respective memory device;

wherein each merge and interleave unit includes:
  a priority generator for each input sorting unit capable of generating a composite request priority from a plurality of characteristics of the access requests and a plurality of received operational characteristics;
  a priority compare circuit capable of selecting one access request;
  a request multiplexer controlled by the priority compare circuit to output the selected access request;
  a plurality of programmable registers;
  a decode unit receiving the selected request from the request multiplexer to determine whether the selected request is a register operation and, if so, to send a plurality of control and data signals to the registers; and
  an output multiplexer for combining register read data with request data for output.

18. The crossbar switch of claim 17, wherein each front end further comprises a Glue logic unit and wherein each of the input sorting units receives the access requests through a respective one of the Glue logic units.

19. The crossbar switch of claim 18, wherein each of the translation circuits is capable of receiving an opcode and a virtual address from their respective device, translating the opcode to determine whether the access request is a read or a write, and mapping the virtual address into a physical address, and forwarding the translated opcode and mapped physical address to its respective input sorting unit.

20. The crossbar switch of claim 17, wherein each of the input sorting units includes a buffer and is capable of buffering the access requests from its respective physical memory device.

21. The crossbar switch of claim 20, wherein the buffer is a first-in, first-out queue.

22. The crossbar switch of claim 20, wherein each of the input sorting units is capable of stalling its respective device when its buffer is full.

23. The crossbar switch of claim 17, wherein each merge and interleave unit further includes:

the priority generator for each input sorting unit being further capable of:
  receiving the plurality of characteristics for the access request received by the input sorting unit;
  receiving the plurality of operational characteristics; and
  generating the composite request priority from the characteristics of the access requests and the operational characteristics;

the priority compare circuit being further capable of:
  comparing the composite request priorities generated by the priority generators; and
  selecting the one access request predicated on the comparison of the composite request priorities.

24. The crossbar switch of claim 17, wherein:

each back end further includes a read buffer capable of receiving and buffering read data from a respective one of the physical memory devices; and each front end further includes an output management unit capable of receiving read data from the read buffers and forwarding the received read data to a respective one of the devices that generated the access request associated with the read data.

25. The crossbar switch of claim 17, wherein each back end further comprises a memory interface capable of receiving the selected access request from the merge and interleave unit and forwarding the selected access request to a respective one of the physical memory devices.

26. A crossbar switch, comprising a plurality of arbitration and select units, each arbitration and select unit including:

a plurality of front ends, each front end comprising:
  means for processing an access request received from a respective device;
  means for buffering and forwarding the processed access request;

means for receiving read data generated by the access request and forwarding the received read data to the respective device; and a plurality of back ends, each back end comprising:
means for arbitrating among competing access requests received from the means for processing an access request, selecting one of the competing access requests, and forwarding the selected request for implementation on a respective memory device; and means for receiving, buffering, and forwarding read data received from the respective memory device to the output management unit of the front end that issued a previously selected access request that generated the read data;

means for generating a composite request priority from a plurality of characteristics for the access requests and a plurality of operational characteristics;

means for selecting one access request; and means for outputting the selected access request via a multiplexing means, the multiplexing means being controlled by the means for selecting the one access request;

means for storing programmable weights;

a decode unit receiving the selected request from the multiplexing means to determine whether the selected request is a register operation and, if so, to send a plurality of control and data signals to the storage means; and means for combining register read data with request data for output.

27. The crossbar switch of claim 26, wherein each back end further comprises a memory interface through which the merge and interleave unit forwards the selected request.

28. The crossbar switch of claim 26, wherein each processing means is further capable of receiving an opcode and a virtual address from their respective device, translating the opcode to determine whether the access request is a read or a write, and mapping the virtual address into a physical address, and forwarding the translated opcode and mapped physical address to its respective input sorting unit.

29. The crossbar switch of claim 26, wherein each of the processed access request buffering means includes a buffer and is capable of buffering the access requests from its respective physical memory device.

30. The crossbar switch of claim 29, wherein the buffer is a first-in, first-out queue.

31. The crossbar switch of claim 29, wherein each of the processed access request buffering means is capable of stalling its respective device when its buffer is full.

32. The crossbar switch of claim 26, wherein each arbitration and selection unit further includes:

means for receiving the plurality of characteristics for the access request received by the input sorting unit, receiving the plurality of operational characteristics, and generating the composite request priority from the characteristics of the access requests and the operational characteristics;

means for comparing the composite request priorities generated by the priority generators, and selecting the one access request predicated on the comparison of the composite request priorities.

33. The crossbar switch of claim 26, wherein:

each back end further includes means for receiving and buffering read data from a respective one of the physical memory devices; and each front end further includes means for receiving read data from the read buffers and forwarding the received read data to a respective one of the devices that generated the access request associated with the read data.

* * * * *